United States Patent [19]

Saeman

[11] 4,293,324

[45] Oct. 6, 1981

[54] PROCESS FOR THE PRODUCTION OF LAYERED GLASS BATCH PELLETS

[75] Inventor: Walter C. Saeman, Cleveland, Tenn.

[73] Assignee: Olin Corporation, New Haven, Conn.

[21] Appl. No.: 123,153

[22] Filed: Feb. 21, 1980

[51] Int. Cl.$^3$ .......................... C03B 1/00; C03C 1/02
[52] U.S. Cl. ......................................... 65/27; 65/134; 106/52; 106/DIG. 8; 264/113; 264/114; 264/117; 501/29; 501/70
[58] Field of Search .................... 65/27, 21.3, 32, 134; 106/52, DIG. 8; 264/15, 113, 114, 117

[56] References Cited

U.S. PATENT DOCUMENTS

| | | | |
|---|---|---|---|
| 2,366,473 | 1/1945 | Bair | 106/52 |
| 3,149,983 | 9/1964 | Maris et al. | 106/52 |
| 3,451,831 | 6/1969 | Miche et al. | 106/52 |
| 3,760,051 | 9/1973 | Eirich et al. | 264/117 |
| 3,788,832 | 1/1974 | Nesbitt et al. | 65/27 X |

FOREIGN PATENT DOCUMENTS 1282868 7/1972 United Kingdom .................... 65/27

OTHER PUBLICATIONS

Sumner, "Method of Preparing Agglomerated Glass-Batch . . . ", South African Published Patent Application No. 69-6971, Oct. 2, 1969.

Primary Examiner—Richard V. Fisher
Attorney, Agent, or Firm—James B. Haglind; Donald F. Clements

[57] ABSTRACT

Layered glass batch pellets are produced in a continuous process which comprises the steps of:
(a) maintaining in the pelletizing zone of a rotary apparatus a moving bed of recycle pellets,
(b) feeding sand and particles of a calcium oxide source into the pelletizing zone,
(c) feeding a solution of sodium hydroxide into the pelletizing zone, the recycle pellets being coated with a layer comprised of the solution of sodium hydroxide, the sand and the calcium oxide source and forming layered pellets,
(d) passing the layered pellets into a heated drying zone exposed to an atmosphere containing carbon dioxide gas,
(e) lifting the layered pellets to the upper part of the drying zone and releasing the layered pellets to separately fall through the drying zone,
(f) simultaneously absorbing carbon dioxide onto the layered pellets while evaporating and removing water from the falling layered pellets to form dried layered pellets, the dried layered pellets having a residual moisture content of less than 15 percent by weight,
(g) passing the dried layered pellets from the drying zone to a recycle zone,
(h) recycling a portion of the dried layered pellets to the pelletizing zone as recycle pellets, and
(i) recovering a portion of the dried layered pellets from the recycle zone as glass batch pellets.

The novel layered pellets are of a homogeneous composition in which the segregation of components such as Na$_2$O is minimized.

10 Claims, 3 Drawing Figures

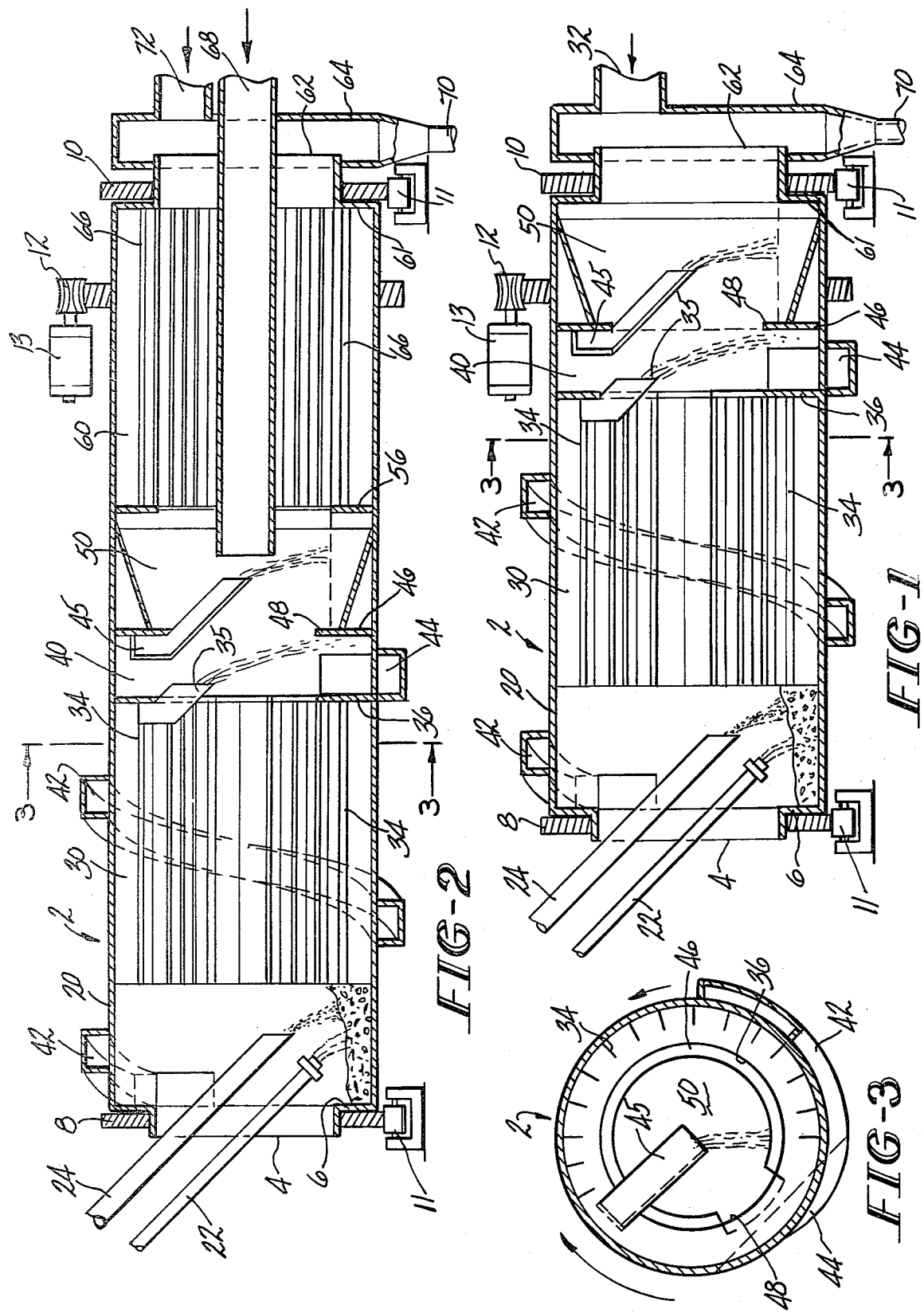

PROCESS FOR THE PRODUCTION OF LAYERED GLASS BATCH PELLETS

This invention relates to the production of pellets used in the manufacture of glass.

Glass such as soda-lime glass is produced by reacting and melting sand, soda ash, and limestone in a furnace to form a homogeneous melt. The use of sodium carbonate in the glass batch introduces dust particles which are entrained in furnace gases. On contact with lining materials in the furnace, sodium carbonate dust particles accelerate the attack of the refractory materials resulting in increased maintenance costs. One method known to suppress $Na_2CO_3$ dust formation is to add water to the glass batch prior to its being fed to the furnace. This water must be evaporated in the high temperature atmosphere of the furnace and results in a curtailment of furnace melting capacity and an increase in fuel consumption per unit of glass produced.

An improvement is obtained by the substitution of solutions of sodium hydroxide for water and a portion of the sodium carbonate used. U.S. Pat. No. 3,149,983 issued Sept. 22, 1964, to L. Maris et al describes the use of caustic soda with soda ash in the production of glass making batches containing sand. Glass batches produced by this method have a tendency to cake and result in handling difficulties.

South African Patent Application No. 69-6971 by C. A. Sumner teaches the preparation of agglomerated glass batch ingredients in a rotary drum having rods to develop a falling curtain of particles onto which a caustic soda solution is sprayed. Similarly, British Patent No. 1,282,868 issued July 26, 1972, to F. G. West-Oram teaches the production of a glass batch in pellet form from sand, limestone, and caustic soda in a rotary dryer with flights. The pellets formed are heated to remove water and to accelerate the reaction of the caustic soda with the sand.

Agglomerates prepared by the processes of South African Application No. 69-6971 and British Patent No. 1,282,868 as well as agglomerates produced in disk-type pelletizing apparatus are formed in sequential pelletization and drying stages where caustic in the interior of the pellet is not completely carbonated. Such pellets are, therefore, hygroscopic and permit segregation of the soluble $Na_2O$ component during drying. These properties result in handling and storage problems and lead to non-homogeneous compositions of the molten glass.

Thus there is a need for a process for the production of glass batch pellets having improved handling and storage properties and of a homogeneous composition from the interior of the pellet to the surface.

It is an object of the present invention to provide a process for the production of glass batch pellets having a homogeneous composition from the interior of the pellet to the surface.

Another object of this invention is to provide a process for the production of non-hygroscopic glass batch pellets having improved handling and storage properties.

A further object of this invention is to provide a process for the production of glass batch pellets which can be produced efficiently in compact apparatus.

An additional object of the present invention is to provide a process for the production of anhydrous glass batch pellets which are non-dusting in the glass furnace.

Yet another object of this invention is to provide a process for the production of glass batch pellets having a multilayer structure and improved pellet strength.

A further object of the present invention is to provide a process for the production of glass batch pellets having controlled size distribution.

A still further object of this invention is to provide glass batch pellets of sufficient strength and of such a size distribution that they can be pre-heated by cascade through heated gases in short exposure times and with a minimum of breakage due to cascade impact.

These and other objects of the present invention are accomplished in a continuous process for the production of layered pellets for glass production which comprises the steps of:

(a) maintaining in the pelletizing zone of a rotary apparatus a moving bed of recycle pellets, (b) feeding sand and particles of a calcium oxide source into the pelletizing zone, (c) feeding a solution of sodium hydroxide into the pelletizing zone, the recycle pellets being coated with a layer comprised of the solution of sodium hydroxide, the sand and the calcium oxide source and forming layered pellets, (d) passing the layered pellets into a heated drying zone exposed to an atmosphere containing carbon dioxide gas, (e) lifting the layered pellets to the upper part of the drying zone and releasing the layered pellets to separately fall through the drying zone, (f) simultaneously absorbing carbon dioxide onto the layered pellets while evaporating and removing water from the falling layered pellets to form dried layered pellets, the dried layered pellets having a residual moisture content of less than 15 percent by weight, (g) passing the dried layered pellets from the drying zone to a recycle zone, (h) recycling a portion of the dried layered pellets to the pelletizing zone as recycle pellets, and (i) recovering a portion of the dried layered pellets from the recycle zone as glass batch pellets.

The above objects and advantages of the present invention may be more readily understood by reference to the following detailed description and to the accompanying FIGURES. Corresponding parts have the same numbers in all FIGURES.

FIG. 1 is an elevational view in section of the rotary apparatus which may be used in practicing the present invention.

FIG. 2 is an elevational view in section of an alternate embodiment of the rotary apparatus which may be used in practicing the present invention.

FIG. 3 is a cross-sectional view taken along the lines 3—3 of FIG. 1.

Referring to the drawings, and in particular FIG. 1, the rotary apparatus of the present invention includes generally a hollow cylindrical shell 2 having a feed end 4 and a discharge end 62. Two riding rings 8 and 10 are mounted on the external peripheral surface thereof. Shell 2 is mounted for rotation about its axis of elongation with the riding rings 8 and 10 riding on trunnion roll assemblies 11. Shell 2 is rotated by suitable ring gear and pinion drive 12 by motor 13. The axis of rotation may be tilted slightly from the horizontal with the discharge end 62 being the lower. Suitable end thrust rollers (not shown) may be provided, as well known in the art, to limit axial movement of the shell 2.

Feed end 4 of shell 2 is open. The aperture diameter of end plate 6 is smaller than the shell diameter to prevent spillage of the bed out of the feed end. A liquid inlet 22 and a dry feed chute 24 extend through opening 4 into the interior of shell 2.

A stationary end housing 64 encloses the discharge end 62 of shell 2. End housing 64 is provided with warm gas duct 32.

Shell 2 contains a plurality of functional zones. The first zone is a pelletizing zone 20 into which are fed solid feed materials through dry feed chute 24 and liquid feeds through liquid inlet 22. Recycled feed particles are introduced into pelletizing zone 20 through recycle spiral conveyor 42 surrounding the exterior surface of shell 2.

Adjacent to pelletizing zone 20 is drying zone 30. Drying zone 30 contains at least one set of circumferentially spaced, radially extending flights 34. Radially extending flights 34 lift moist pellets from the bed of drying zone 30 to the top of drying zone 30 and release the pellets to fall separately through the drying zone to the bed. Gas duct 32 introduces warm gases for drying the pellets. Dam ring 36 is spaced downstream with respect to pellet flow of its associated flights 34. Attached to dam ring 36 is adjustable elevator and deflector scoop 35 used to control the depth of the pellet bed adjacent to dam ring 36 by depositing dried pellets into recycle zone 40. After dam ring 36, the inner wall of the shell 2 is bare, forming the recycle zone 40 which separates drying zone 30 from the classification zone 50.

Recycle zone 40 contains inlet 44 to spiral conveyor 42 which recycles a portion of the dried pellets to pelletizing zone 20. Another portion of the dried pellets is transported by elevator and deflector scoop 45 over dam ring 46 having adjustable gate 48, into classification zone 50.

Classification zone 50 is conically shaped with the smaller diameter adjacent to recycle zone 40. Dried pellets are fed from recycle zone 40 by elevator and deflector scoop 45 to the center of classification zone 50. Small pellets flow back towards recycle zone 40 and are readmitted to recycle zone 40 through adjustable gate 48 in dam ring 46. Larger pellets flow towards discharge end 62. Large pellets overflow end plate 61 and enter discharge end 62 into end housing 64. From end housing 64, the dried pellets are discharged through opening 70.

In the alternate embodiment illustrated in FIG. 2, end housing 64 is provided with warm gas duct 68 as well as hot gas duct 72. Gas duct 68 introduces warm gases for drying the pellets in drying zone 30.

Pre-heating zone 60 receives large dried pellets which overflow dam ring 56 at the discharge end of conically shaped classification zone 50. Pre-heating zone 60 contains at least one set of circumferentially spaced, radially extending flights 66. Hot gas duct 72 introduces hot gases into preheating zone 60. Preheated pellets are discharged through discharge end 62 into end housing 64. From end housing 64, the preheated pellets pass directly through opening 70 into a glass furnace (not shown).

As shown in FIG. 3, a set of flights 34 encircle the inner circumference of cylindrical shell 2 in drying zone 30. Dam ring 36 controls the bed depth of drying zone 30 and the flow of dried pellets into recycle zone 40. Rotation of cylindrical shell 2 in a clockwise direction deposits dried pellets in inlet 44 of recycle spiral conveyor 42. Recycled pellets sliding inside recycle spiral conveyor 42 are returned to pelletizing zone 20. Elevator and deflector scoop 45 deposits dried pellets into classification zone 50 downstream from dam ring 46 having adjustable gate 48. Return of the dried pellets from classification zone 50 to recycle zone 40 is controlled by adjustable gate 48.

In the process of the present invention, glass batch pellets are formed in the pelletizing zone of the apparatus. The pellets are produced from a feed mix which includes ingredients which provide $SiO_2$, $CaO$, $MgO$, $Na_2O$, $K_2O$, and other components which may be employed in the production of glass.

Glass batch pellets produced by the process of the present invention may contain the ingredients for producing commercial silicate glasses as given, for example, in Table 3 on pages 542–543 of volume 10 of the Kirk-Othmer *Encyclopedia of Chemical Technology*, 2nd edition, 1966. This table includes compositions containing $SiO_2$, $Al_2O_3$, $B_2O_3$, $Li_2O$, $Na_2O$, $K_2O$, $MgO$, $CaO$, $PbO$ as major constituents with other ingredients listed as well, with the desired ratios employed in glass manufacture given in percent by weight. Preferred are glass batch pellets for silicate glass compositions whose principle use is for flat glass, lighting ware, laboratory ware, light bulbs, and tumblers as well as in glass fiber insulation. Preferred glass batch pellets are those whose compositions are suitable for the production of soda-lime glasses used in flat glass, containers and incandescent light bulbs or tubes. A widely employed soda-lime glass composition contains (as percent by weight) 72 percent silica, 15 percent soda and 10–13 percent CaO (or CaO and MgO) with perhaps minor amounts of other metal oxides.

Sand is preferably used to supply the $SiO_2$ requirements although, for example, alkali metal silicates may be employed. Any sand which is suitable for use in glass production may be employed. Sand particles are normally employed having the size distribution ranges of the natural product. Size reduction by crushing is generally not required.

Any source of CaO which is employed in glass manufacture may be used in producing the glass batch pellets.

The CaO ingredient is usually derived from crushed limestone or dolomite, however, burnt lime or hydrated lime can be suitably used in place of or in mixtures with limestone. Crushed limestone particles are employed whose sizes are similar to that of the sand used, for example, particles having size distributions in the range of about 50 percent of minus 50 mesh to about 10 percent minus 100 mesh. However, pellet formation is facilitated by using more finely pulverized limestone or dolomite or by using burnt lime or hydrated lime.

The $Na_2O$ requirements of the pellets are preferably provided by employment of an aqueous solution of sodium hydroxide. A partial replacement of NaOH can be made using a solution of $Na_2CO_3$ or dry $Na_2CO_3$. $Na_2CO_3$ can be used as the sole source of $Na_2O$ where burnt lime or hydrated lime are used as the source of CaO. Suitable concentrations of aqueous solutions of sodium hydroxide include those of from about 25 to about 75, preferably those of from about 40 to about 65, and more preferably those of from about 45 to about 55 percent by weight of NaOH.

In addition to these basic ingredients, the glass batch may contain a large number of additives which are commonly used in glass production including those listed above as well as those which supply $Fe_2O_3$, $TiO_2$, $SO_2$, and oxides of other metals of Groups III, IV, V, and VIII of the Periodic Table.

Sand, limestone, and other dry solid ingredients are fed separately or blended and fed to the pelletizing zone in suitable amounts to provide the desired ratios of $SiO_2$, $Na_2O$, and CaO in the glass batch.

In producing glass batch pellets by the process of the present invention, the sodium hydroxide solution is fed or dispersed into a rolling or tumbling bed of sand, limestone, and recycle pellets from the recycling zone. The feed rate of the aqueous solution is controlled to wet the solid ingredients and maintain a cohesive condition between the sand, limestone, and recycle pellets while providing the desired amounts of $Na_2O$. Suitable wetting of the recycle pellets is obtained, for example, by controlling the residual moisture content in the dried recycle pellets and by feeding the dry solids into the bed in close proximity to the caustic solution inlet. The sodium hydroxide solution is a source of soluble solids in the composition of the pellets. The sodium hydroxide solution contains sufficient water to form a tacky surface on the recycle pellets to which the sand and limestone particles adhere to form a new layer.

The recycle pellets used as seed particles in the pelletizing zone provide a core of sufficient strength so that the new layers of solids formed by subsequent deposition of the feed ingredients can endure drying without cracking or deformation.

Bed temperatures in the pelletization zone are maintained in the range of from about 70° to about 120° C. and preferably from about 90° to about 100° C. The bed is heated, for example, by warm gases passing counter-currently from the drying zone; from the pre-heating zone through the drying zone; or by direct heating of the pelletization zone.

Bed transport within the rotating drum moves the moist coated seed pellets into the drying zone. Heated gas, for example air, contacts the glass batch pellets to evaporate and remove water. Water in the caustic solution in excess of that required to maintain pellet residual moisture content is immediately volatilized in the drying zone. This causes the NaOH to crystallize and prevents the migration of the soluble $Na_2O$ components into subsequently deposited layers. Radial lifter flights installed in the drying zone lift the layered pellets to the upper portion of the drying zone and release them to fall separately through the heated gas and thus provide for controlled heat transfer. In a preferred embodiment, the drying gas contains carbon dioxide. During the evaporation of water, absorption of carbon dioxide from the drying gases onto the newly deposited layer reacts with the NaOH and progressively converts the cohesive solution bonds provided by the caustic solution into crystalline bonds of sodium carbonate. This further prevents the migration of soluble soda compounds into subsequently deposited layers of feed materials onto the surface of the pellets. Carbon dioxide also reacts with CaO to form calcium carbonate. $CaCO_3$ may also react with NaOH to produce additional crystalline bonds of $Na_2CO_3$. Formation of crystalline bonds in the newly deposited layers strengthens and toughens the pellets. The formation of $Na_2CO_3$ from NaOH by absorption of $CO_2$ also neutralizes hygroscopic properties of the caustic soda.

Gases, such as air and flue gases used in drying the pellets are at temperatures in the range of from about 150° to about 500° C., and preferably from about 250° to about 450° C. As a component of the drying gases, any sufficient amount of $CO_2$ may be employed which will react with the caustic soda to form sodium carbonate. Suitable amounts of $CO_2$ include those from about 2 to about 30 percent by weight of the hot gas.

The pellets are retained in the drying zone for a period sufficiently long enough to evaporate water in excess of that required to provide the dried pellets with the desired residual moisture content. Suitable drying times include those of from about 5 to about 50 minutes. The dried pellets have a residual moisture content of less than 15 percent by weight and preferably in the range of from about 4 to about 10 percent by weight. Residual moisture includes water of hydration and free water present in the pellet.

As the bed of dried layered pellets builds up due to the growth of pellets and the increasing number of pellets, dried pellets overflow dam ring 36 into recycle zone 40. Pellets are also deposited into recycle zone 40 by elevator and deflector scoop 35. A major fraction of these dried pellets, for example, from about 75 to about 95 percent pass through the inlet of spiral recycle conveyor 42 and are returned to the pelletizing zone as recycle pellets. Also returned to the pelletizing zone through spiral recycle conveyor 42 are unagglomerated dry solids such as sand and limestone. The remaining portion of dried layered pellets is transferred to classification zone 50 by elevator and deflector scoop 46. Scoop 46 is adjustable between a zero bed depth setting wherein the inlet end of the scoop 46 is in engagement with the internal periphery of shell 2 and a full bed depth wherein the inlet end of scoop 46 is at a height at least equal to that of adjustable gate 48.

Pellets from recycle zone 40 are deposited by elevator and deflector scoop 46 near the center of classification zone 50. In the rotating conical classification zone, the smaller pellets segregate at the smaller diameter adjacent to recycle zone 40. The flow of smaller pellets back into recycle zone 40 is regulated by adjustable gate 48. To minimize direct by-passing of small pellets and unagglomerated sand and limestone back into the classification zone, elevator and deflector scoop 45 is positioned in relation to adjustable gate 48 and conveyor inlet 44. Larger pellets deposited in classification zone 50 will move towards the larger diameter of the cone. The bed depth in the classification zone is regulated by dam ring 56 or end plate 61. Pellets overflowing these barriers enter discharge end 62 and are discharged from end housing 64 through opening 70, or enter pre-heating zone 60.

Classified layered pellets exiting from classification zone 50 have a diameter of from about 1.5 to about 26 and preferably from about 3 to about 20 millimeters.

As shown in FIG. 2, pre-heating zone 60 is fitted with lifter flights 66 to provide for controlled heat transfer and pellet advancement. Any residual moisture in the pellets is volatilized in the initial section of pre-heating zone 60. The flow of hot gases, which is counter to the movement of classified pellets through the pre-heating zone 60, blows any unagglomerated sand and limestone which may result from impact breakdown of the pellets, back into the classification zone. Thus the pre-heated pellets emerge from the pre-heating zone free of unagglomerated material which would otherwise contribute to undesirable segregation of the raw materials entering the glass furnace. Counter-current flow of the hot gases also allows controlled pre-heating of the pellets to the maximum practical pre-heat temperature limited only by the entrance temperature of the gases. Hot gases employed in pre-heating zone 60 include air and preferably hot exhaust gases from a glass furnace as well as those from separate burners used to supply heat to the pelletization zone. These exhaust gases generally contain carbon dioxide and sulfur dioxide derived from the combustion of carbon and sulfur in the fuel as well as the decomposition of carbonates and, where present, sulfates in the glass furnace feed mix. Gas temperatures are those sufficient to heat the pellets suitable for direct addition to a glass furnace. For example, suitable temperatures for the pre-heated pellets are those in the range of from about 200° to about 800° and preferably temperatures in the range of from about 200° to about 600° C.

The novel process of the present invention produces multi-layered pellets having a homogeneous cross-sectional composition from the interior to the surface. By producing pellets by the formation of thin layers (onion-skin increments) by depositing moist glass batch ingredients on a dry substrate on each pass through the recycle system, migration of soluble NaOH is prevented. The repeated recycle of the pellet through the pelletization zone and drying zone, for example, up to as many as 20 recycles, converts the major portion of NaOH in the layer to less soluble and non-hygroscopic $Na_2CO_3$. This process imparts strength and hardness to the multi-layer pellet which is not attainable by the single-step procedures previously employed in preparing glass batch pellets. Because of the low concentrations of residual moisture in pellets recycled or recovered from the drying zone, dehydration and pre-heating can then be effected in a subsequent operation with no further migration of soluble soda compounds occurring. Multi-layered pellets produced by the novel process of the present invention can endure storage and handling and pre-heating treatments without excessive breakdown and dust formation.

Novel layered pellets are produced by the process of the present invention having a controlled range of particle sizes. The pellets are of a homogeneous composition in which segregation of components such as $Na_2O$ is minimized. The pellets are non-cohesive so that each pellet can float independently on molten glass. Density of the pellets is less than that of the glass melt so that the pellets melt on the surface of molten glass without sinking into the molten glass thereby optimizing heat transfer in the glass production process. The layered pellets melt at temperatures below which substantial amounts of pollutants such as nitrogen oxides are generated from the glass melt. The novel layered pellets are non-hygroscopic and can be stored for extended periods of time without clumping or agglomerating. Pellet hardness is sufficient so that additional handling will not produce significant amounts of dust or fine particles.

The following examples are intended to further illustrate the present invention and are offered without any intent to pose any limitations upon the present invention.

EXAMPLE 1

A drum, cylindrical in shape, 12 inches in diameter and 10 inches long and having a sealed flat bottom was mounted on a flange so that the drum axis was horizontal. The flange was attached to the horizontal output shaft of a motorized speed reducer geared for an output shaft speed of 29 rpm. The other end of the drum was fitted with a conical restriction terminating in an access opening 6 inches in diameter. The interior of the drum was fitted with 12 radial flights 1 inch in height secured at points approximately equidistant around the interior wall. As the initial seed bed, about 10 pounds of screened pellets about 6.5 millimeters in diameter were loaded into the drum. A mixture of screened sand (+40 mesh) and finely pulverized hydrated lime was prepared in amounts which provided a $SiO_2$ ratio of CaO of 72:13. The mixture was added to the drum in 2.5 pound increments. Heat was provided by a gas-oxygen torch burning liquified petroleum gas (LPG) whose flame was projected into the interior of the drum through the upper portion of the 6 inch access opening. A 50 percent caustic solution was projected horizontally into the drum in the lower portion of the access opening and at an angle with respect to the drum axis to allow caustic impingement near the mid-point of the cascading bed inside the drum. Caustic projection was by feeding the caustic at a regulated rate into an air stream of sufficient velocity to break the liquid into droplets and to project these droplets about 8 inches into the interior of the drum before contacting the cascading dry solids and recycle pellets. The caustic solution was fed to the drum in amounts which provided a ratio of $SiO_2$ to $Na_2O$ of 72:15 to the glass batch feed. The bed temperature was in the range of 90° to 100° C. The pelletization process was run with the drum rotating at 29 rpm until a total of 20 pounds of the sand-hydrated lime feed mix had been fed to the drum. The central portion of the access opening between the flame and the caustic spray provided access for intermittent manual additions of dry feed. Excess material inside the drum, due to build-up of the bed, was allowed to spill out of the access opening into a pan. The material was screened and undersized material returned to the drum through the access opening. Sufficient $CO_2$ was present in the combustion gas to gradually carbonate the caustic in the feed. The time required to pelletize 20 pounds of feed mix was 1 to 2 hours. At the end of the pelletization run, there was no evidence of unagglomerated sand fines in the bed and 20 pounds of pellets were recovered. The layered pellets were dried. The dry layered pellets produced were sufficiently hard so that they could not be crushed by hand. Pellet sizes in the product were in the range of from 3 to 16 millimeters in diameter. Due to the short length of the drum, the pelletization and drying zones in this example were actually super-imposed onto one another. Recycle was therefore not required. While this tended to impair the degree of controllability of bed moisture for maximum pellet strength, the pelletized product exhibited sufficient strength for subsequent pre-heating without breaking.

EXAMPLE 2

The procedure of EXAMPLE 1 was repeated using crushed limestone having about 50 percent of minus 40 mesh fines in place of hydrated lime. The seed bed consisted of 10 pounds of pellets produced in the run of EXAMPLE 1. During the pelletization run in which 20 pounds of the sand-limestone feed mix were fed to the rotary drum, the bed temperature was in the range of 90° to about 100° C. with a moisture concentration of the bed at about 6 percent. Hard dry layered pellets were successfully produced during the run having a size range of 3 to 16 millimeters.

What is claimed is:

1. A continuous process for the production of layered pellets for glass production which comprises the following steps:

(a) maintaining in a pelletizing zone of a rotary apparatus a moving bed of recycle pellets, (b) feeding sand and particles of a calcium oxide source into said pelletizing zone, (c) feeding a solution of sodium hydroxide into said pelletizing zone, said recycle pellets being coated with a layer comprised of said solution of sodium hydroxide, said sand and said calcium oxide source and forming layered pellets, (d) passing said layered pellets into a heated drying zone exposed to an atmosphere containing carbon dioxide gas, (e) lifting said layered pellets to the upper part of said drying zone and releasing said layered pellets to separately fall through the drying zone, (f) simultaneously absorbing carbon dioxide onto said layered pellets while evaporating and removing water from said falling layered pellets to form dried layered pellets, said dried layered pellets having a residual moisture content of less than 15 percent by weight, (g) passing said dried layered pellets from the drying zone to a recycling zone, (h) recycling a portion of said dried layered pellets to said pelletizing zone as said recycle pellets, and (i) recovering a portion of said dried layered pellets from said recycle zone.

2. The process of claim 1 in which said layered pellets in said drying zone are heated by passing a stream of gas through said drying zone, said layered pellets in said drying zone being maintained at a temperature in the range from about 70° to about 120° C.

3. The process of claim 2 in which said carbon dioxide containing gas is an exhaust gas from a glass furnace.

4. The process of claim 3 in which said gas contains carbon dioxide in an amount of from about 2 to about 30 percent by weight of said exhaust gas.

5. The process of claim 1 in which said calcium oxide source is selected from the group consisting of limestone, dolomite, burnt lime, and hydrated lime.

6. The process of claim 1 in which prior to step (i), a portion of said dried pellets in said recycling zone is passed into a pre-heating zone, maintained at a temperature in the range from about 200° to about 800° C. to produce pre-heated pellets.

7. The process of claim 1 in which prior to step (i), a portion of said dried layered pellets is passed into a classifying zone.

8. The process of claim 1 or 2 in which said solution of sodium hydroxide contains from about 25 to about 75 percent by weight of NaOH.

9. The process of claim 8 in which said calcium oxide source is crushed limestone.

10. The process of claim 8 in which said calcium oxide source is hydrated lime.

* * * * *